United States Patent [19]

Sasshofer et al.

[11] 4,107,827

[45] Aug. 22, 1978

[54] APPARATUS FOR PRODUCING SYNTHETIC FIBERS

[75] Inventors: Franz Sasshofer, Ried i.I.; Friedrich Gotschy, Vöcklabruck; Johannes Krässig, Seewalchen; Adalbert Wimmer, Vöcklabruck, all of Austria

[73] Assignee: Chemiefaser Lenzing Aktiengesellschaft, Lenzing, Austria

[21] Appl. No.: 775,773

[22] Filed: Mar. 9, 1977

Related U.S. Application Data

[62] Division of Ser. No. 642,016, Dec. 18, 1975, Pat. No. 4,025,598.

[30] Foreign Application Priority Data

Jan. 3, 1975 [AT] Austria .................................... 20/75

[51] Int. Cl.[2] .............................................. B29C 17/10

[52] U.S. Cl. .................................... 28/246; 83/425.3; 83/649; 425/66; 425/71; 425/301; 425/306

[58] Field of Search ................... 425/66, 289, 71, 301, 425/306, 402; 83/425.3, 649; 28/246

[56] References Cited

U.S. PATENT DOCUMENTS

| | | | |
|---|---|---|---|
| 2,710,060 | 6/1955 | Birkmann | 83/649 |
| 2,728,950 | 1/1956 | Annesser | 264/147 |
| 3,524,789 | 8/1970 | Olsen | 264/158 X |

*Primary Examiner*—Francis S. Husar
*Assistant Examiner*—John McQuade
*Attorney, Agent, or Firm*—Brumbaugh, Graves, Donohue & Raymond

[57] ABSTRACT

A method of producing threads and fibers of synthetic materials uses a cylindrically-shaped body of the synthetic material which is allowed to rotate against a scratching tool and a peeling knife arranged to follow the scratching tool in the direction of rotation. The peeled-off curtain of parallel threads is stretched, possibly while being simultaneously heated, and possibly the threads are cut to form a staple fiber or are ground to a short-staple floccule. A device for carrying out the afore-mentioned method, has a turning mechanism, a foil-peeling knife secured to a carriage of the turning mechanism, and a scratching tool arranged to precede the peeling knife.

6 Claims, 4 Drawing Figures

APPARATUS FOR PRODUCING SYNTHETIC FIBERS

This is a division, of application Ser. No. 642,016, filed Dec. 18, 1975, now Pat. No. 4,025,598.

BACKGROUND OF THE INVENTION

The invention relates to apparatus for producing threads and fibers of synthetic materials, in particular materials of high-melting or non-melting polymers, e.g. difficult-to-dissolve or insoluble polymers, such as polytetrafluorethylene.

The known melting-spinning methods or dissolving-spinning methods are not suited for the production of fibers or threads from high-melting or non-melting polymers or from difficult-to-dissolve or insoluble polymers, respectively. Fibers and threads of such polymers are, however, in many cases of great technical interest because of their specific properties. Fibers and threads of polytetrafluorethylene are, for example, remarkable for their high resistivity to temperature and chemicals, as well as for their extremely low adhesion-friction coefficient. Therefore these fibers and threads, despite their relatively high costs, are used in the production of special technical articles, such as interwoven sealing packages for stuffing boxes, textures and felts for the filtration of aggressive gases or liquids.

Threads of polytetrafluorethylene are customarily produced in a suspension or matrix-spinning procedure, in which the finest particles of the polymer are suspended in a viscose liquid, e.g. an alkaline solution of sodium-cellulose-xanthate, and are spun together with this liquid. After spinning the cellulose threads are subjected to a thermal treatment in which the matrix disintegrates and the polytetrafluorethylene particles sinter together. Thus stretchable threads are obtained. Originally their color is dark-brown due to carbon residues, but by a special bleaching procedure the threads may be changed into a light-colored product, with a corresponding loss of rigidity.

Austrian Patent No. 290,710 describes a method of continuously producing fibers and threads of a polymer foil. According to this method a foil is split up into threads by means of cutting tools arranged transverse to the running direction of the foil, while the foil is stretched at the same time. The foils may be produced in a manner known per se, e.g. in the case of polytetrafluorethylene they may be produced by paste extrusion or by peeling cylindrical sintered blocks of polytetrafluorethylene.

SUMMARY OF THE INVENTION

It is the object of the present invention to avoid the disadvantages of known methods of making thread and fibers, to achieve threads and fibers with uniformly fine single thread thicknesses and to increase the economy and operational reliability of the method. According to the invention this object is achieved in that a cylindrically-shaped body of the synthetic material is allowed to rotate against a scratching tool that is provided with a certain number of scratching edges, and also against a peeling knife arranged to follow the scratching tool in the rotating direction. Next the curtain of peeled-off parallel threads is stretched in one step or in several steps, possibly while being simultaneously heated, and then the threads may possibly be cut to staple fibers or ground to short-staple flock or floccule i.e. extremely short fibers (e.g. 1–3mm). The method disclosed herein is remarkable for being particularly simple, for avoiding melting and dissolution processes and for making it possible to do without complicated machinery.

The scratching tool, arranged to lie in front of the line of application of the peeling knife, scratches the surface of the rotating cylindrically-shaped body of synthetic material in such a way that on the surface of the shaped body a plurality of closely spaced parallel grooves running side by side, are created. The peeling knife arranged to follow the scratching tool does not peel off a continuous foil, but peels off a curtain of parallel single threads that are subsequently stretched and coiled or are possibly cut to staple fibers. The pressure of attack of the scratching tool is suitably adjusted in such a way that the scratching depth is somewhat deeper than the peeling depth.

Preferably a total stretching ratio lying between 1:2 and 1:8 is used.

Suitably the curtain of threads is heated by means of heating bows, by hot air, steam, high-boiling liquids, or the like, wherein, according to the type of synthetic material used, the temperature of the heating medium is kept between 100° and 450° C.

Advantageously the thickness of the peeled foil or threads, respectively, is to be 0.005 to 0.02 mm. Single-thread titers (thicknesses) of e.g. 3 to 7 dtex (1 dtex = 0.9 denier) can be produced uniformly, reliably and safely. The scratching tools can be used over a long period without any fault occurring; they have a very good resistance to wear.

The invention comprises a device for carrying out the above-described method. The device comprises a turning mechanism, in particular a lathe, onto whose spindle a cylindrically-shaped body of synthetic material can be stuck, and a lathe carriage to which a foil-peeling knife is fastened. According to the invention a scratching tool with scratching edges parallel to each other and located in the circumferential direction of the scratching tool is arranged to precede the peeling knife. The distance between the scratching edges suitably amounts to 0.05 to .2 mm. Behind the peeling knife, guiding and transporting devices are arranged for removing the peeled-off thread curtain and additionally a one-step or a multiple-step stretching device and possibly a cutting device are arranged after the guiding devices.

The scratching tool may suitably be a packet of razor blades or a steel band with sawtooth-like scratching edges. As a scratching tool one may also use a roller with peripherally running scratching edges.

BRIEF DESCRIPTION OF THE DRAWINGS

The invention will now be described by way of example with reference to the accompanying drawings, in which.

FIGS. *2a* and *2b* show scratching tools on an enlarged scale.

DESCRIPTION OF EXEMPLARY EMBODIMENTS

A cylindrical block of synthetic material, in particular of sintered polytetrafluorethylene, is placed on the spindle of a lathe and is fixed thereto. The lathe is provided with an automatic revolution-measuring instrument, so that the circumferential speed of the block can be kept constant regardless of the block radius. To the lathe carriage a peeling knife 3 is secured. The knife, depending on the adjustment of its position, is capable of peeling off foils of a certain thickness (preferably from 0.005 to 0.02 mm). Such foil-peeling machines comprising a lathe and a peeling knife are known per se.

Figure 1:
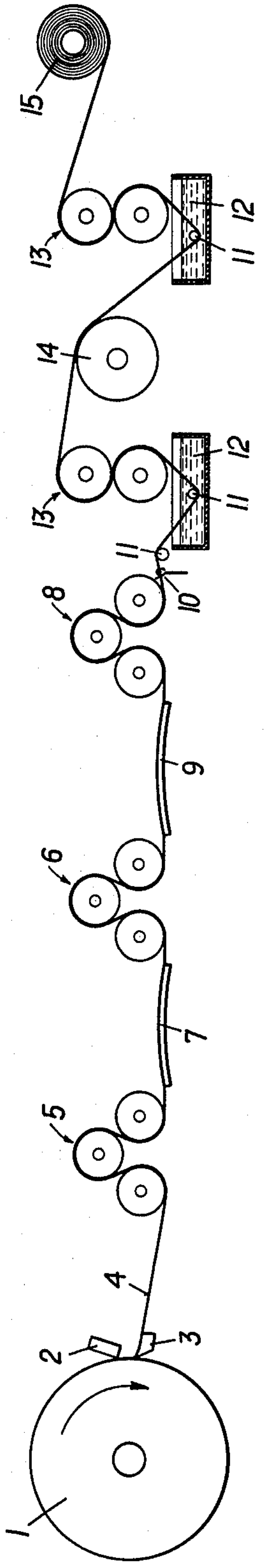
FIG. 1 is a schematic illustration of the method.
Figure 2:
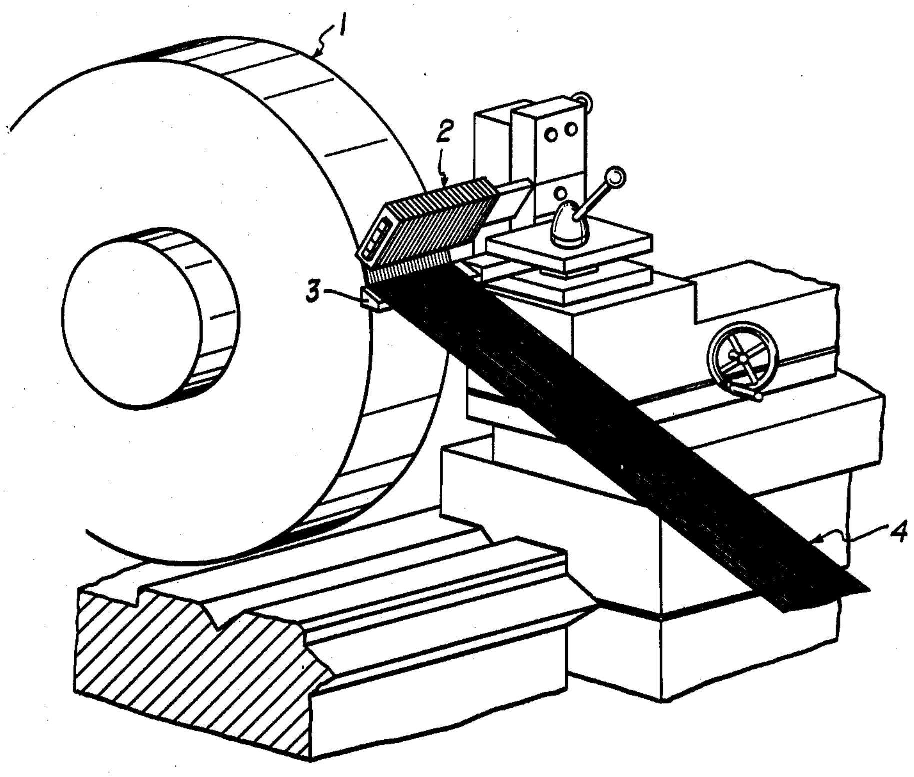
FIG. 2 illustrates the creation of the threads.
Figure 2A:
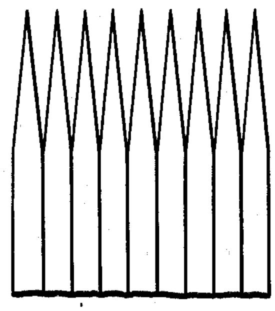
Figure 2B:
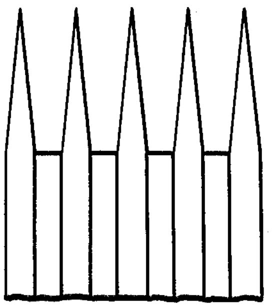

According to the invention a scratching tool is arranged in front of the line of contact of the peeling knife. In a way not illustrated in detail, the knife is capable of being swung or adjusted in relation to the surface of the cylindrical block of synthetic material. In the embodiment according to FIG. 2 a packet of razor blades is used as the scratching device 2 the distance between the individual cutting edges of the blades being 0.05 to 2 mm. The circumferential speed of the block is variable and preferably lies between 20 to 50 m/min. Instead of a razor-blade packet one may also use steel bands having a sawtooth-like profile, as is illustrated in FIGS. 2*a* and 2*b*. When the scratching device is swung against the cylinder, parallel grooves are scratched into the surface of the cylinder, which grooves are somewhat deeper than the depth of the foil to be peeled off so that a curtain of parallel threads 4 forms behind the peeling knife. 3. This thread curtain is fed to a three-high roller arrangement 5, which at the same time serves as a conveyor for the subsequent stretching procedure. The main stretching of the thread curtain, preferably at a ratio of 1:4, occurs between the three-high roller arrangement 5 and a three-high roller arrangement 6 while the thread curtain in being guided over a heating bow 7. Therefore a subsequent stretching of the thread curtain is carried out between the three-high roller arrangement 6 and another three-high roller arrangement 8 while being passed over a heating bow 9. The stretching ratio is preferably 4:4.2 in this second stretching zone. Behind the three-high roller arrangment 8 the thread curtain is combined by means of a thread guide 10 to form a cable and when producing dry silk yarn the cable is fed directly to the reel 15. If according to a modified embodiment of the invention, impregnated yarn is produced, prior to being wound up the cable is passed through one or two impregnating devices, comprising deflection bars 11, a dipping bath 12, a two-high presser arrangement 13 and a dry reel 14.

The method of using the invention is illustrated in more detail by the following examples:

EXAMPLE 1

From a 100 mm wide cylindrical sintered block of polytetrafluorethylene, after scratching the cylindrical surface with a sawtooth-like scratching tool having a tooth-point distance of 0.25 mm, 400 threads having a thickness of 0.020 mm are peeled off at a speed of 40m/min. They are stretched in two steps at temperatures lying between 250° and 380° C, at a total stretching ratio of 1 : 4.2. Thus, a white polytetrafluorethylene yarn is obtained, which has a yarn titer (thickness) of 10,000 dtex and a single-thread titer of 25 dtex.

EXAMPLE 2

From a 100 mm wide cylindrical sintered block of polytetrafluorethylene, after scratching the cylindrical surface with a sawtooth-like scratching device having tooth-point distance of 0.125 mm, 800 threads having a thickness of 0.010 mm are peeled off at a speed of 50 m/min. They are subdivided into four equal size thread curtains and are stretched in two steps at temperatures ranging from 250° to 380° C at a total ratio of 1 : 5.3. The stretched threads are wound up on 4 reels at a speed of 265 m/min. Thus four identical white yarns are obtained, which have yarn titers of 1000 dtex and single-thread titers of 5 dtex.

EXAMPLE 3

From a 100 mm wide cylindrical sintered block of polytetrafluorethylene, after scratching the cylindrical surface with a sawtooth-like scratching device having a tooth-point distance of 0.10 mm, 1000 threads having a thickness of 0.008 mm are peeled off at a speed of 30 m/min. The threads are next stretched in two steps at temperatures ranging between 250° and 380° C at a total ratio of 1 : 4.2 and are wound up at a speed of approx. 126 m/min. Thus a white polytetrafluorethylene yarn is obtained, which has a yarn titer of 4000 dtex and a single-thread titer of 4 dtex.

By the method disclosed herein it is possible to produce defined threads of a uniform titer or, if desired, of small titers without entanglements. Threads of special polymers, in particular polymers resistant to temperature and especially to chemicals and having a high resistance to tearing can be produced, which threads are excellently suited for technical usage. For certain fields of application the threads may be impregnated with certain preparations.

We claim:

1. An apparatus for producing threads and fibers of synthetic materials, in particular of materials including high-melting, non-melting, difficult-to-dissolve and insoluble polymers, comprising:

a turning mechanism with a carriage and a spindle adapted to receive a cylindrically shaped body of synthetic material for rotation thereof;

a foil peeling knife secured to the carriage of the turning mechanism so as to peel off a layer of the synthetic material;

a scratching tool arranged to precede said foil-peeling knife in the rotation direction of said cylindrically shaped body of synthetic material and carrying a plurality of parallel scratching edges which are adapted to scratch the periphery of the cylindrical body of synthetic material so as to form a plurality of parallel grooves in that body; and a guiding and transporting section arranged to follow said foil peeling knife and adapted to draw off a curtain of parallel threads peeled off by the foil peeling knife from the parallel grooves in the synthetic material, which guiding and transporting section includes stretching means for stretching the threads in at least one step.

2. An apparatus as set forth in claim 1, wherein the turning mechanism is a lathe.

3. An apparatus as set forth in claim 1, wherein the scratching edges are arranged at a distance from each other of 0.05 to 2 mm.

4. An apparatus as set forth in claim 1, wherein the stretching means is a multiple-step stretching means.

5. An apparatus as set forth in claim 1, wherein the scratching tool is a packet of razor blades.

6. An apparatus as set forth in claim 1, wherein the scratching tool is a steel band having sawtooth-like scratching edges.

* * * * *

UNITED STATES PATENT OFFICE

CERTIFICATE OF CORRECTION

Patent No. 4,107,827 Dated Aug. 22, 1978

Inventor(s) Sasshofer et al.

It is certified that error appears in the above-identified patent and that said Letters Patent are hereby corrected as shown below:

Col. 1, line 55, "thread" should read --threads--.

Col. 2, line 12, after "but" insert --instead--;
line 42, ".2 mm" should read --2 mm--
line 63, after "block" insert -- 1 --.

Col. 3, line 29, "in" should read --is--;
line 30, "Therefore" should read --Thereafter--;
line 62, after "having" insert --a--.

Signed and Sealed this

*Third* Day of *April 1979*

[SEAL]

*Attest:*

RUTH C. MASON
*Attesting Officer*

DONALD W. BANNER
*Commissioner of Patents and Trademarks*